United States Patent
Khasawneh et al.

(10) Patent No.: US 12,367,173 B2
(45) Date of Patent: Jul. 22, 2025

(54) SYSTEM, APPARATUS AND METHOD FOR DYNAMICALLY CONFIGURING ONE OR MORE HARDWARE RESOURCES OF A PROCESSOR

(71) Applicant: Intel Corporation, Santa Clara, CA (US)

(72) Inventors: Shadi Khasawneh, Austin, TX (US); Sabine Francis, Austin, TX (US); Hanna Alam, Jish (IL); Alexander Gendler, Kiriat Motzkin (IL)

(73) Assignee: Intel Corporation, Santa Clara, CA (US)

(*) Notice: Subject to any disclaimer, the term of this patent is extended or adjusted under 35 U.S.C. 154(b) by 970 days.

(21) Appl. No.: 17/130,012

(22) Filed: Dec. 22, 2020

(65) Prior Publication Data

US 2022/0197856 A1 Jun. 23, 2022

(51) Int. Cl.
*G06F 15/78* (2006.01)
*G06F 9/445* (2018.01)
(Continued)

(52) U.S. Cl.
CPC ........ *G06F 15/7882* (2013.01); *G06F 11/302* (2013.01); *G06F 11/3409* (2013.01);
(Continued)

(58) Field of Classification Search
CPC ............. G06F 11/3409; G06F 11/3051; G06F 15/7882; G06F 15/7871; G06F 9/44505;
(Continued)

(56) References Cited

U.S. PATENT DOCUMENTS 6,185,712 B1 * 2/2001 Kirihata ........... G11C 29/50012
714/724
10,223,131 B1 * 3/2019 Lieberman .......... G06F 11/3664
(Continued)

FOREIGN PATENT DOCUMENTS

EP 3885919 A1 9/2021

OTHER PUBLICATIONS

Stephen J. Tarsa, et al., "Post-Silicon CPU Adaptation Made Practical Using Machine Learning," ISCA '19, Jun. 22-26, 2019, 13 pages total.
(Continued)

*Primary Examiner* — Ji H Bae
(74) *Attorney, Agent, or Firm* — Nicholson De Vos Webster & Elliott LLP

(57) ABSTRACT

In one embodiment, a processor includes: at least one configuration register to store configuration information for a hardware resource including a control circuit to configure the hardware resource based at least in part on the configuration information; a performance monitor to maintain performance information during execution of an application on the processor; and a controller coupled to the at least one configuration register. The controller may dynamically provide the configuration information to the at least one configuration register based at least in part on the performance information, and the control circuit is to adjust a performance tuning of the hardware resource according to the configuration information. Other embodiments are described and claimed.

13 Claims, 14 Drawing Sheets

(51) Int. Cl.
   *G06F 11/30* (2006.01)
   *G06F 11/34* (2006.01)
   *G06F 12/0862* (2016.01)
   *G06N 20/00* (2019.01)

(52) U.S. Cl.
   CPC ......... *G06F 12/0862* (2013.01); *G06N 20/00* (2019.01); *G06F 9/44505* (2013.01); *G06F 11/3051* (2013.01); *G06F 15/7871* (2013.01); *G06F 2212/602* (2013.01)

(58) Field of Classification Search
   CPC ............... G06F 11/302; G06F 12/0862; G06F 2212/602; G06N 20/00
   USPC ................................. 713/1, 100; 700/29, 47
   See application file for complete search history.

(56) References Cited

U.S. PATENT DOCUMENTS

| | | | |
   |---|---|---|---|
   | 2007/0094453 A1 | 4/2007 | Santhanakrishnan et al. | |
   | 2008/0162799 A1 | 7/2008 | Spry et al. | |
   | 2012/0310618 A1* | 12/2012 | B'Far | G06F 11/3447 |
   | | | | 703/13 |
   | 2017/0205863 A1 | 7/2017 | Lee et al. | |
   | 2020/0065712 A1* | 2/2020 | Wang | G06N 20/20 |
   | 2020/0183482 A1 | 6/2020 | Sebot et al. | |
   | 2020/0249962 A1* | 8/2020 | Vichare | G06F 9/5083 |
   | 2020/0257539 A1* | 8/2020 | Borlick | G06N 20/00 |
   | 2020/0293835 A1* | 9/2020 | Doni | G06F 11/3409 |

OTHER PUBLICATIONS

European Patent Office, Extended European Search Report mailed Mar. 14, 2022 in European Patent Application No. 21196200.6 (14 pages).

Charles et al., "Efficient Cache Reconfiguration Using Machine Learning in NoC-Based Many-Core CMPs", ACM Transactions on Design Automation of Electronic Systems, vol. 24, No. 6, Article 60, Sep. 2019.

Office Action, EP App. No. 21196200.6, Mar. 12, 2025, 7 pages.

* cited by examiner

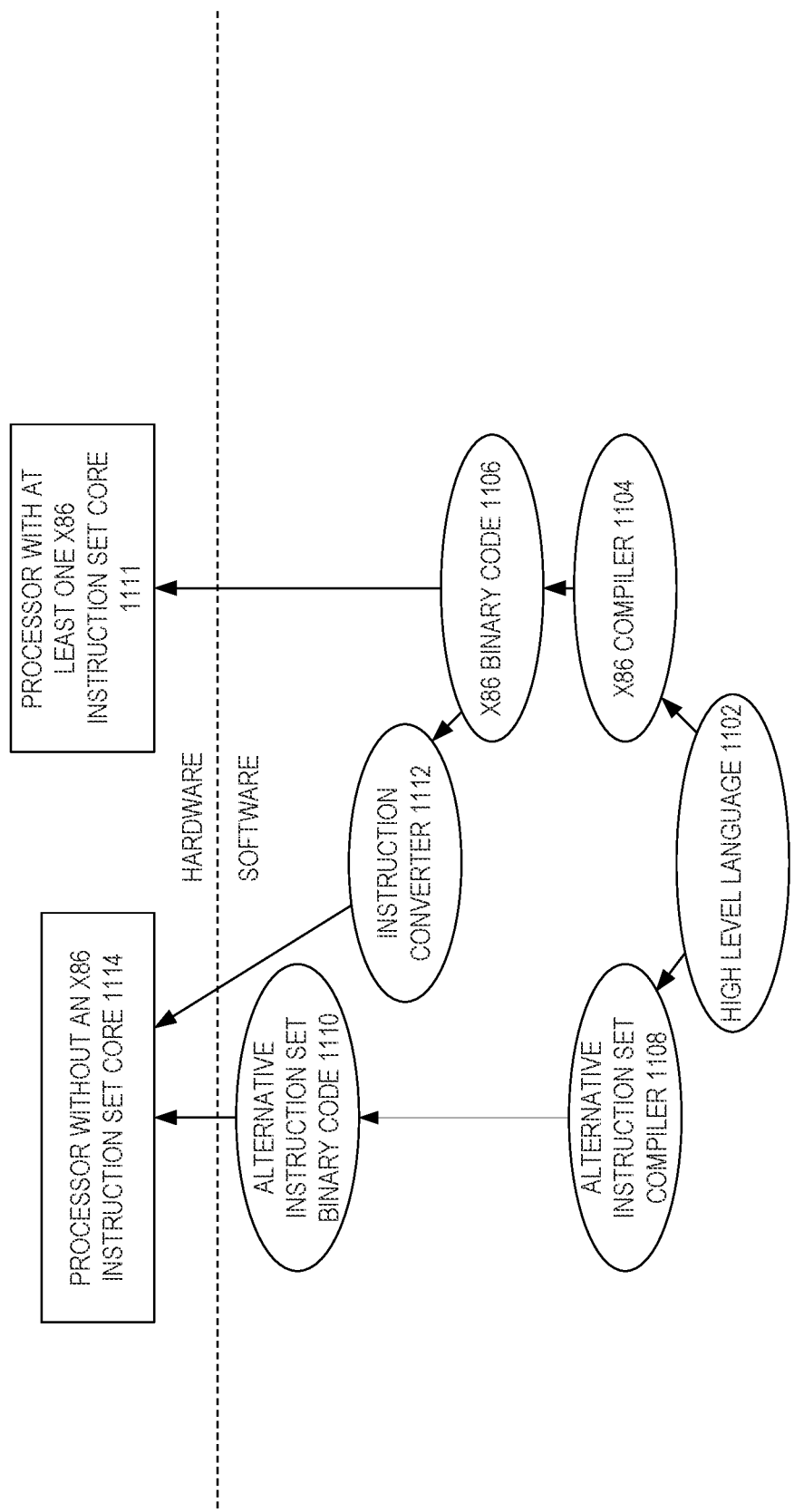

SYSTEM, APPARATUS AND METHOD FOR DYNAMICALLY CONFIGURING ONE OR MORE HARDWARE RESOURCES OF A PROCESSOR

TECHNICAL FIELD

Embodiments relate to techniques for dynamically configuring hardware resources of a processor.

BACKGROUND

In modern processors, it is typical for certain microarchitectural hardware features to be controlled based on settings in configuration (system) registers (CRs or CSRs). For example, a prefetcher may have CSRs that control its enablement, and when enabled how aggressive it should be in prefetching. These CSRs are used to tune each feature for workloads. However, the same feature may have different optimal settings depending on what set of workloads are prioritized; and when the list of workloads changes, it may not be possible to retune. Thus, given a processor and a set of workloads, a compromise is always made to determine CRs settings that provide the best overall weighted gain across a variety of applications. Typically, this optimal overall setting is different than the optimal individual setting for each application. In addition, processor runtime state impacts the optimal CRs settings for a given application. For example, an application running by itself behaves differently when running with lots of concurrent traffic, and thus the optimal CRs will be different. Thus, compromises are often made with an impact on both power and performance of a processor.

BRIEF DESCRIPTION OF THE DRAWINGS

FIG. 11 is a block diagram contrasting the use of a software instruction converter to convert binary instructions in a source instruction set to binary instructions in a target instruction set according to embodiments of the invention.

DETAILED DESCRIPTION

Figure 1:
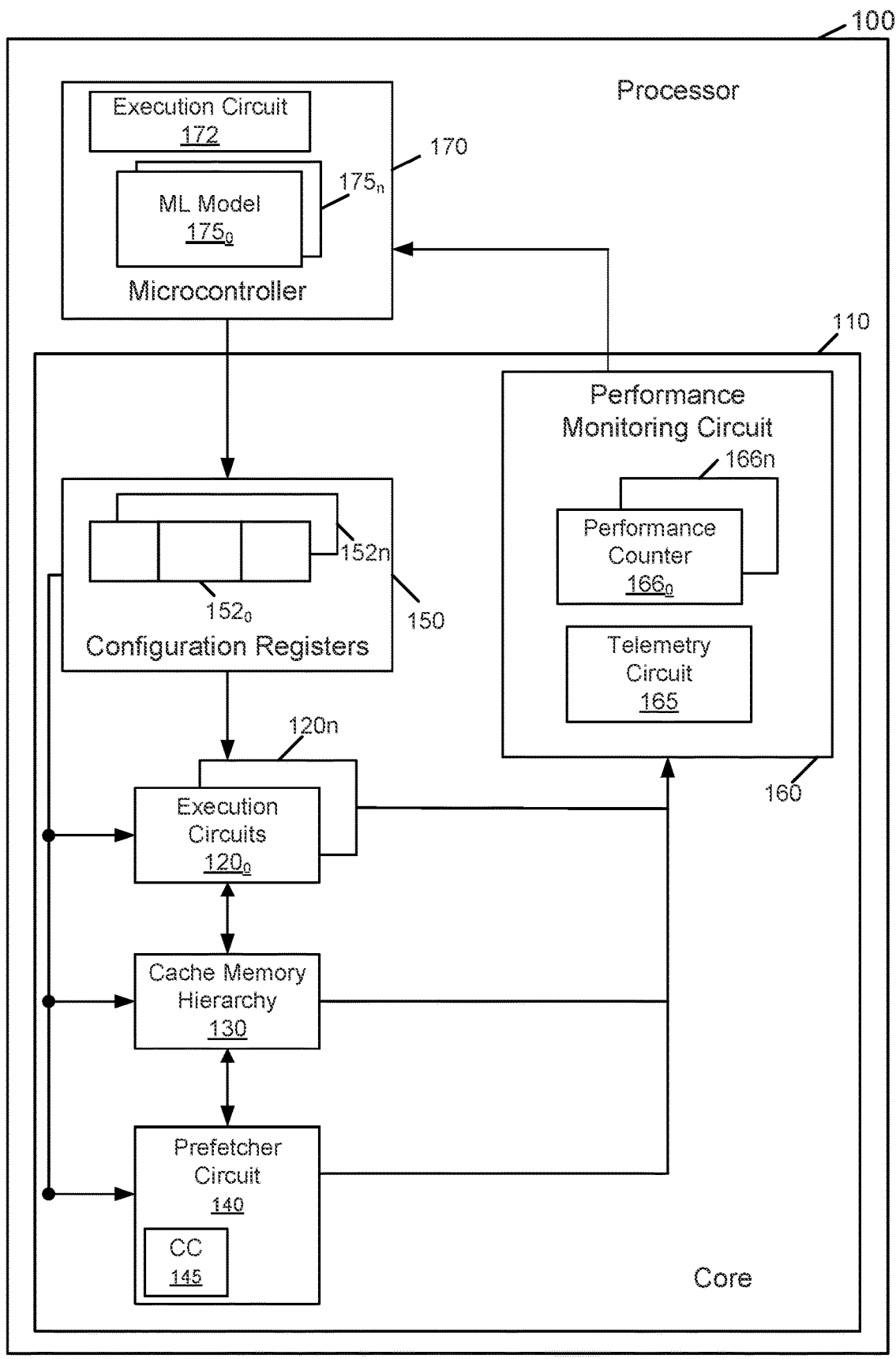
FIG. 1 is a block diagram of a processor in accordance with an embodiment.

In various embodiments, a processor may be configured to dynamically determine optimal power and performance (PnP) settings for one or more hardware resources of the processor, based at least in part on an application under execution and/or a phase within such application, along with a given overall processor state. More specifically, embodiments herein can improve power and performance of execution across a wide variety of operating use cases in market segments for a wide set of workloads, in contrast to a single/static configuration that is optimized to an overall compromised gain across all workloads. In this way, embodiments may avoid making compromises in configuring operation of a processor. Although embodiments are not limited in this regard, example resources that may benefit from techniques herein include hardware features within processor cores including micro-architectural hardware resources, non-core circuitry, and memory controller circuitry of a system-on-chip (SoC) or other processor features. More particularly, embodiments may be used to dynamically adjust performance tuning of one or more hardware resources.

In embodiments, determination of optimal configuration settings for a given processor resource may begin by generating offline profiling data (e.g., in the form of performance counter information, telemetry information, and/or monitoring information) for the phases of different applications. This data is used to train a machine learning (ML)/statistical model that is used to predict the optimal PnP configuration settings. This model can then be periodically executed during runtime to dynamically determine optimal configuration settings based on running applications and SoC state. These optimal configuration settings in turn may be provided as configuration information to configuration or other registers. In turn, control circuitry may dynamically adjust a performance tuning of one or more hardware resources according to this configuration information. In this way, embodiments may improve SoC power and performance across all market segments.

Moreover, embodiments enable a processor to perform better on a much wider set of workloads (WLs), instead of having a single/static configuration that optimizes the gain across all WLs. Still further with an embodiment, tuning of configuration settings differently for each stock keeping unit (SKU) or customer can be avoided, along with different firmware versions for a given product. In addition, the models may be dynamically updated and/or additional models may be provided in the field to resolve specific customer performance issues by releasing patches that change the dynamic behavior.

As one example use case, based on application type (for example, core-bound, memory-bound or so forth), different configuration settings may be used. As such, embodiments provide dynamic mechanisms to change configuration registers using hardware and/or firmware, based on the running workloads and SoC state. Stated another way, embodiments may adaptively program configuration registers including configuration (system) registers (CSRs) and/or model specific registers (MSRs) to their optimal settings based on a current phase of the running applications and SoC state.

Embodiments may provide greater performance benefit than a static configuration that compromises based on an overall best configuration for a range of applications. This is so because a single best configuration may be identified for each application and/or phase. Thus, as an example where a feature has four possible configurations, instead of sweeping the four configurations on a range of applications and compromising on one of them with the best overall PnP benefit, each and every application phase can be associated with a single best one of those four configurations.

In an implementation, multiple features may be optimized by: (1) generating different configuration sets; (2) performing offline training; and (3) performing an online inference process to dynamically identify an optimal configuration for a hardware resource based at least in part on application phase and processor state.

In embodiments, configuration set generation may be done by silicon tuning, application profiling and/or obtaining them from feature experts/architects. The goal is to determine optimal settings for phases, instead of whole applications. As an example, for a prefetcher circuit, there may be four configurations available: an optimal baseline, which is the best overall compromise; a conservative configuration set; a very conservative configuration set; and an aggressive configuration set. For example, a prefetcher may have CSRs that control how many times it is to see a pattern before triggering prefetches for that pattern/page. As an example, an optimal baseline could be 6 based on an overall WL list. A more conservative setting could be 10 and a very conservative one could be 14. On the other hand, a more aggressive setting of 3 may be better for applications with simple and very repetitive patterns.

After these configuration sets are generated, an offline training may be performed by generating profiling data (metrics, performance counters, telemetry, etc.) for each application phase for each configuration set. In different implementations, this offline training may be done in simulation and/or on a processor chip (post-Silicon). Note that if phases cannot be identified, the performance monitoring information (PMI) may be sampled at a fixed number of instructions, e.g., at every 200K instructions. The selected telemetry and/or PMI represent the application phase running, as well as the SoC state. In an embodiment, the specific profiling data used for optimizing a prefetcher may include cache metric information such as hit rate, miss rate, useless prefetch rate, stalls or so forth. Note that these metrics may be obtained from information in one or more performance counters and telemetry circuits.

For each phase, the optimal configuration can be found using a function like instructions per cycle (IPC), or a more complex function like IPC over bandwidth utilization, or any other optimization cost function. For each phase, a new entry (e.g., row) is added to a training set, with the telemetry as input/features and the optimal configuration as output/label. Note that one of a number of different statistical/machine learning algorithms that filter the most correlating metrics to the optimal configuration/label can be used. This may help filter out the number of performance monitoring information/telemetry inputs to be considered. After pruning the feature list, the ML model is trained. This trained model is then run on the processor.

Once the ML algorithm and the set of PMI/telemetry are selected, the ML model is ready to be deployed and used for online inference. To this end, the model may be implemented in a processor by building a configurable dedicated hardware block to perform inference or included within the firmware. In this model, the inputs are the telemetry/PMI, and the output is the optimal configuration settings for one or more hardware features.

Note that online inference may be implemented in several different manners. For example, the algorithm can be implemented in hardware as a state machine or in firmware by writing code for execution on a microcontroller. In a particular embodiment, the model may be implemented as a Random Forest (RF) algorithm to be executed at a predetermined interval, e.g., every 100 microseconds. At this interval, the microcontroller reads performance monitoring information/telemetry, and runs the inference code to predict the optimal configuration out of the available configurations for a given processor resource, and then uses it to program one or more CSRs/MSRs that store the configuration values for the hardware resource.

While an exemplary resource described herein is an L2 prefetcher, understand that embodiments are not limited in this regard and other embodiments may be used for other processor resources such as a memory controller that can be dynamically reconfigured to dynamically change, e.g., a memory controller's read/write major mode CSRs to control a read starve count, write mode thresholds, cache replacement policies, dead block predictor thresholds and many others performance features, among others.

Referring now to FIG. 1, shown is a block diagram of a processor in accordance with an embodiment. As shown in FIG. 1, processor 100 may be any type of processor such as a multi-core processor, SoC, graphics processor or similar dedicated or general-purpose processor to execute instructions. In the high level shown in FIG. 1, details of certain portions of an example core 110 are shown to illustrate an embodiment. Understand of course that processor 100 may include many more components including additional cores, which may be configured the same or differently as core 110, interface circuitry, memory controller circuitry, graphics processing circuitry and so forth.

In the embodiment of FIG. 1, processor 100 includes a plurality of execution circuits $120_0$-$120_n$. In different embodiments, the execution circuits may take various forms, and may include integer and floating-point execution circuits, among others. As seen, execution circuits 120 couple to a cache memory hierarchy 130. While shown as an independent cache hierarchy, understand that different portions of cache memory may be located in different portions of processor 100. For example, internal to core 110, multiple lower-level cache memories including an L1 cache memory and an L2 cache memory may be present, while additional portions of a cache memory hierarchy, including a shared cache memory such as a last level cache, can be located in another portion of processor 100.

As further illustrated in FIG. 1, a prefetcher circuit 140 is coupled to cache memory hierarchy 130. In embodiments herein, one example of prefetcher circuit 140 is an L2 prefetcher that is configured to prefetch data for storage in an L2 cache memory. In general, prefetcher circuit 140 may operate in a conventional manner to prefetch data speculatively based on a prediction of data likely to be used in the near future. As shown in FIG. 1, prefetcher circuit 140 includes a control circuit 145 that is configured to control prefetch operations based at least in part on configuration information received from one or more configuration registers $152_{0-n}$, present in a configuration register storage 150. With embodiments herein, various controllable aspects of prefetcher circuit 140 may be controlled according to this configuration information that in turn may be provided to configuration register storage 150 based at least in part on a given application phase in execution and overall processor state. Note that controllable aspects of other hardware resources may be controlled using configuration information in other ones of configuration registers 152.

To this end, during operation, performance information may be provided from various processor resources including execution circuits 120, cache memory hierarchy 130 and prefetcher circuit 140 to a performance monitoring circuit 160. In the illustration shown, performance monitoring circuit 160 includes a telemetry circuit 165 and a plurality of performance counters $166_{0-n}$. Note that telemetry circuit 165 may be configured to obtain telemetry information from these and other components of core 110. Understand that various processor resources including execution circuit 120, cache memory hierarchy 130 and prefetcher circuit 140 themselves may include internal monitoring circuitry to monitor operation and provide information to performance monitoring circuit 160.

Relevant to the discussion herein, at least some of the performance monitoring information present in performance monitoring circuit 160 may be provided to a microcontroller 170 that includes an execution circuit 172. In embodiments, microcontroller 170 may be a general-purpose low power controller to execute various algorithms, including one or more machine learning models $175_{0-n}$. While shown as being external to core 110, in some embodiments a microcontroller may be included within a core. Understand that in other implementations another programmable processing circuit, e.g., another core or other processing logic or hardware dedicated logic or state machine, may execute models 175. In embodiments herein, a given machine learning model 175 may perform classification based on performance monitoring information from performance monitoring circuit 160 to identify aspects of a particular workload under execution, such as identifying a particular application phase. In turn based upon this identification, machine learning model 175 may provide corresponding configuration information to one or more configuration registers 152. In an embodiment, each model 175 may be associated with one or more processor features.

With regard to prefetcher circuit 140, based upon an identified application and/or phase, a given machine learning model 175 may provide various configuration information to one or more configuration registers 152 to be used for configuring prefetcher circuit 140. As examples, this configuration information may be used by control circuit 145 to configure prefetcher circuit 140, e.g., to enable it according to an enable indicator of the configuration information, to control its aggressiveness according to mode information of the configuration information (e.g., a selected one of multiple available modes), as well as to control its operation. For example, when it is determined that an application is in a particular phase of operation in which some type of access pattern can be identified, this configuration information may be used to control prefetcher circuit 140 to prefetch data from a further portion of a memory hierarchy and/or system memory hierarchy according to the identified pattern (e.g., every 2 lines, 3 lines, 4 lines or so forth).

Understand while shown at this high level in the embodiment of FIG. 1, many variations and alternatives are possible. For example, while the above embodiment describes a prefetcher circuit as an example processor resource that may be dynamically reconfigured to fine-tune its future behavior during operation based on identification of a particular application and/or phase in execution, embodiments are not limited in this regard. Instead, any one of a number of a wide variety of processor resources may be dynamically re-configured as described herein to obtain greater performance in an adaptive manner. As examples, these processor resources may include cache controller circuitry, which may be dynamically reconfigured to control cache replacement policies based on identified application and/or phase, scheduling circuitry, memory controller circuitry, among many other such processor resources. Other processor resources that can be dynamically tuned may include fabrics, caches, and other micro-architectural features within intellectual property (IP) circuits such as a central processing unit (CPU), graphics processing unit (GPU) or Peripheral Component Interface Express (PCIe) device. A branch predictor within the CPU could have CSRs, as well as direct memory access (DMA) parameters within IO/PCIe controllers.

Note that machine learning models 175 may be provided to microcontroller 170 for execution in various matters. In some cases, machine learning models may be burned into a chip as programmed fuses or other non-volatile storage on manufacture. In other instances, machine learning models may be provided by way of firmware or other boot code that is stored in a non-volatile device and provided to processor 100 on boot. In yet other cases, machine learning models may be provided by means of firmware updates/patches, after deployment to customers. It is also possible to provide an interface to allow customers or users to load their own ML algorithm securely using drivers or other operating system (OS) hooks.

Figure 2:
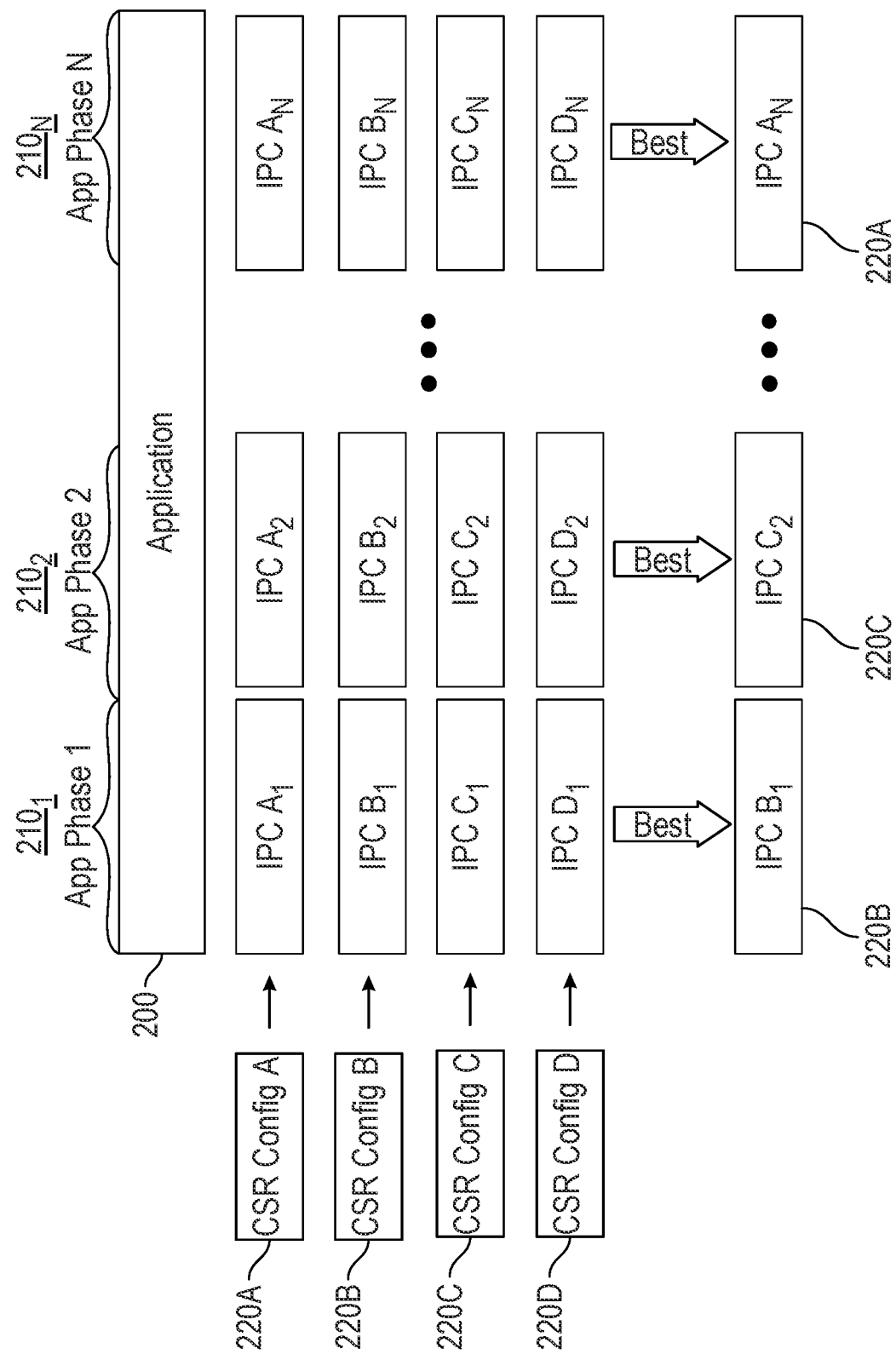
FIG. 2 is a block diagram of a result of a dynamic configuration process in accordance with an embodiment.

Referring now to FIG. 2, shown is a block diagram of a result of a dynamic configuration process in accordance with an embodiment. More specifically as shown in FIG. 2, a training process is performed on an application 200. Application 200 may include multiple phases, namely application phases $210_1$-$210_N$. Although embodiments are not limited in this regard, in one implementation each application phase may be a predetermined number of instructions, e.g., 200K instructions or a predetermined number of cycles.

To perform training, application 200 may be executed iteratively, each with a different configuration set, shown as configuration sets 220A-220D. During execution of each phase, performance monitoring information may be obtained for each application phase. For ease of discussion, a single performance monitoring parameter, namely instructions per cycle (IPC), is shown. Of course, in various implementations, more and different performance monitoring information can be obtained based on the optimization function.

After execution with the multiple configuration sets, an analysis process is performed. Here for each application phase, a configuration set (having one or more configuration values) may be identified that corresponds to the optimal (based on the optimization function) performance/power result for the phase. Thus as shown, with a dynamic training process as described herein, an SoC or other processor may have dynamic configuration settings for each application phase identified based on the best performance metrics obtained during execution with a given configuration set. Namely as shown, in first application phase $210_1$, a second configuration set 220B is selected, for second application phase $210_2$ a third configuration set 220C is selected, and finally, for application phase $210_n$, a first configuration set 220A is selected. While these configuration sets can be provided to a processor in different manners, in embodiments herein, the optimal configuration sets may be included in a machine learning model.

With these settings that are based on runtime conditions, an optimal configuration set may be provided for one or more configuration registers. In this way, embodiments may provide greater power and performance capabilities as compared to a conventional processor. This is so, even when a processor is tuned to recognize a best overall configuration.

Figure 3:
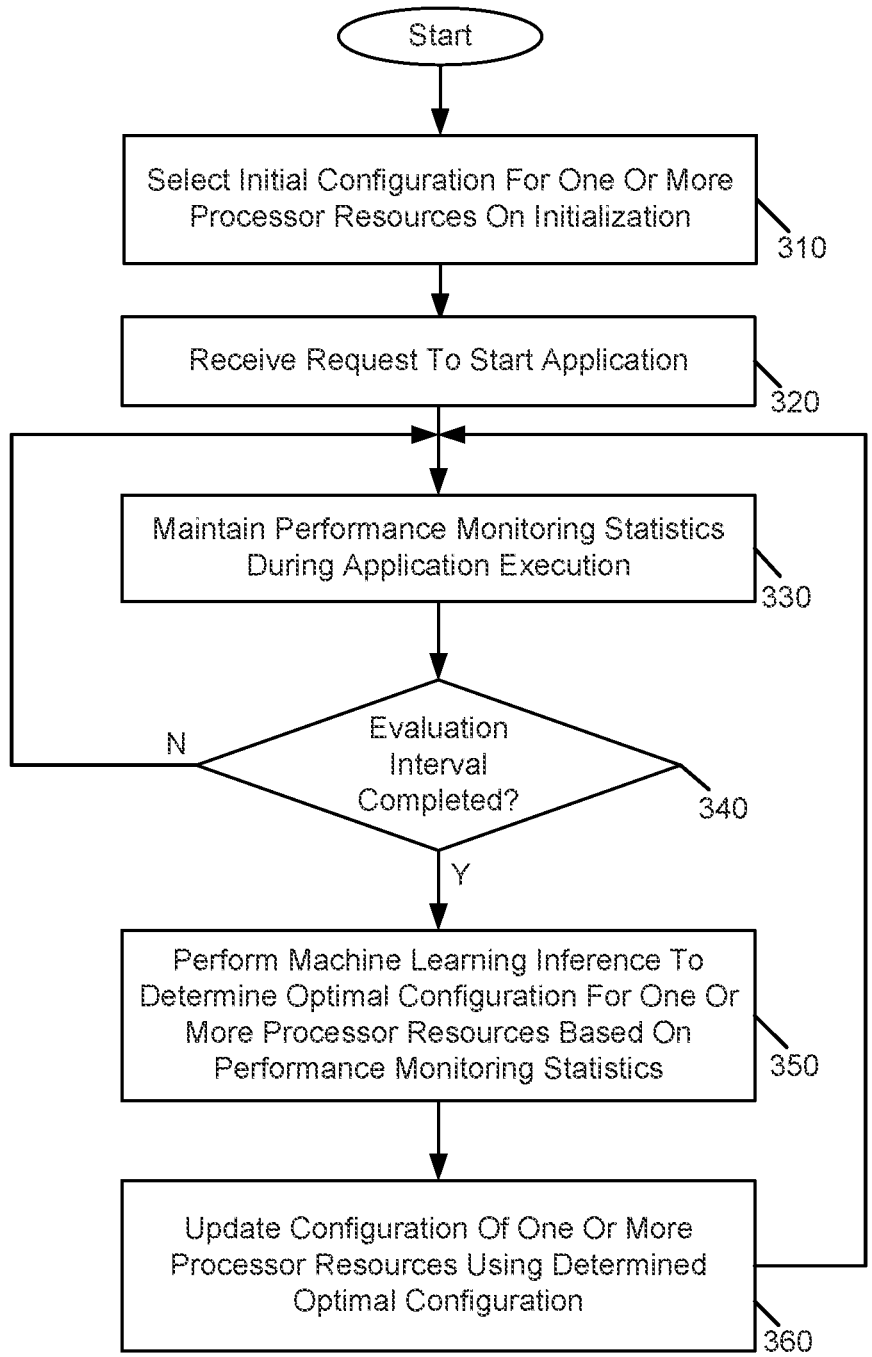
FIG. 3 is a flow diagram of a method in accordance with an embodiment.

Referring now to FIG. 3, shown is a flow diagram of a method in accordance with an embodiment. As shown in FIG. 3, method 300 is a method for runtime configuration of one or more processor resources using an embodiment herein. As such, method 300 may be performed by various circuitry of a processor such as a processor 100 of FIG. 1. In various implementations, method 300 may execute within various hardware circuitry of a processor, which may include processing circuitry (e.g., processing device, circuitry, dedicated logic, programmable logic, microcode, etc.) to perform the method and which may execute firmware and/or software (e.g., instructions run on a processing device), as examples.

As illustrated, method 300 begins at block 310 where an initial configuration for one or more processor resources may be selected on initialization of the processor. For example, firmware may control an initial configuration for various processor features, including a prefetcher circuit, memory controller and other such circuits. Understand that these initial configuration settings may be generically optimized for a given execution environment, such as a particular type of computing system in which a processor is located. For example, certain performance features may be controllably enabled or disabled and/or otherwise controlled depending upon the execution environment, e.g., whether a device having the processor is battery powered or AC powered.

Next, control passes to block 320 where a request is received to start execution of a given application. To this end, code of the application may be obtained and executed within the processor. During such execution at block 330 performance monitoring statistics may be maintained. Continuing with the example of a prefetcher circuit, these performance monitoring statistics may include one or more cache metrics. In the example of controlling a configuration of a memory controller, such performance monitoring statistics may include read starve or latency count information.

Still with reference to FIG. 3, next it is determined whether an evaluation interval has completed (diamond 340). Although embodiments are not limited in this regard, this evaluation interval may be a given amount of instructions, execution cycles and/or time. As an example, an evaluation interval may be between approximately 100K and 300K instructions. When it is determined that an evaluation interval has completed, control passes next to block 350.

At block 350, a machine learning classifier or other machine learning algorithm may be executed to determine an optimal configuration for one or more processor resources based at least in part on the performance monitoring statistics. Again, with reference to a prefetcher circuit, based on statistics (e.g., cache metrics), a given application and/or phase may be identified that in turn is associated with one or more configuration settings. In turn, these configuration settings may be provided to one or more configuration registers that can be used to update at block 360 configuration of the prefetcher (and/or other processor resource) using the determined optimal configuration. Control passes back to block 330, where performance monitoring statistics may continue to be maintained during application execution. In some cases note that the statistics may be reset prior to a next evaluation interval. Understand while shown at this high level in the embodiment of FIG. 3, many variations and alternatives are possible.

Figure 4A:
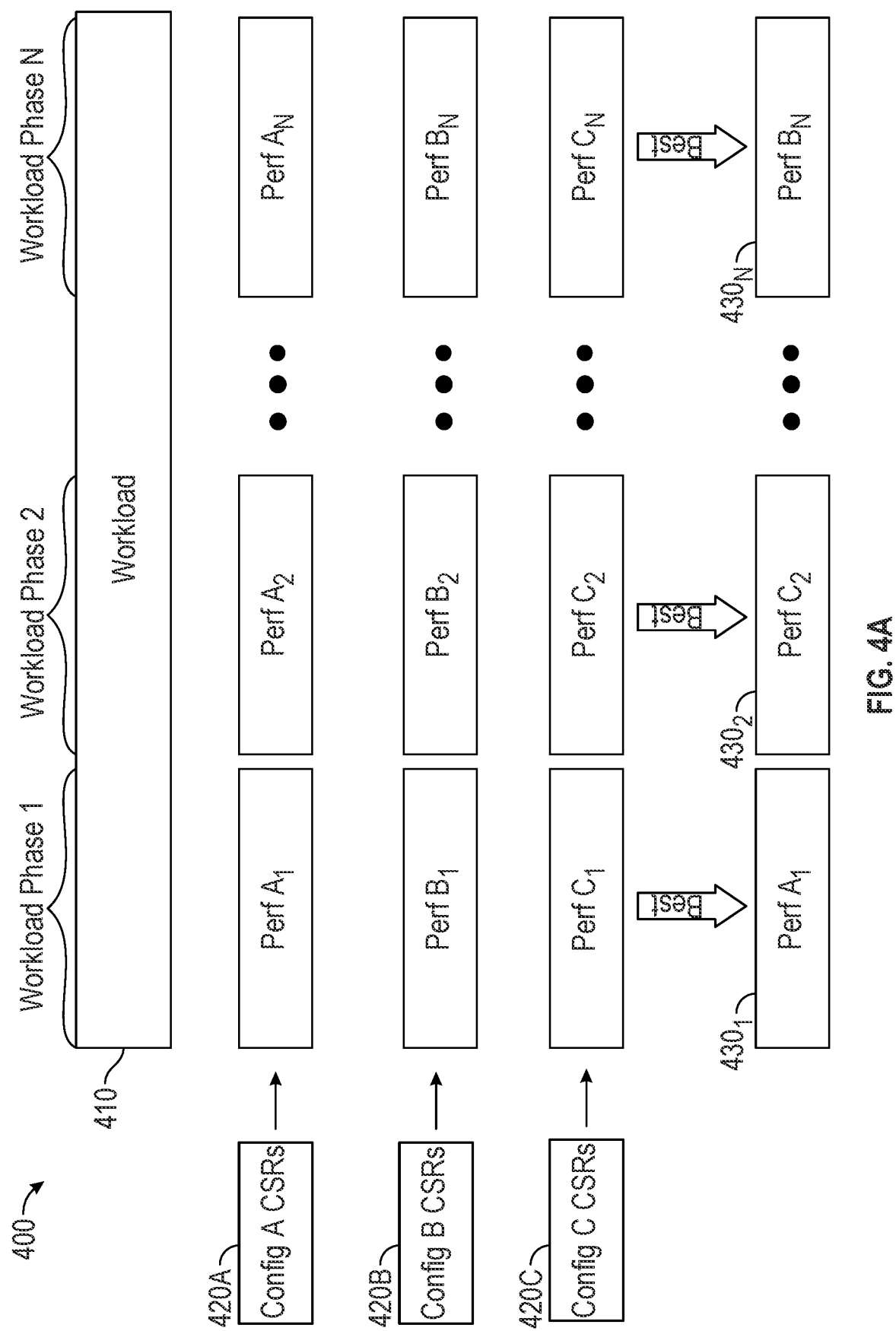
FIG. 4A is a diagram illustrating a static training process in accordance with an embodiment.

Referring now to FIG. 4A, shown is a diagram illustrating a training process in accordance with an embodiment. As shown in FIG. 4A, a training process 400 may be performed as an offline static training process in which a workload 410 having a plurality of phases is executed iteratively using different configuration settings. As shown, there are three different sets of candidate configuration settings 420A-420C. For discussion purposes, assume that each candidate configuration settings 420 is implemented by way of one or more configuration values stored in one or more CSRs. For example, for a prefetcher circuit, these configuration values may relate to enabling of the prefetcher, aggressiveness of the prefetcher, configuration of a pattern of prefetching and so forth.

As illustrated, during each execution of workload 410 with given configuration settings 420, performance may be measured by way of performance monitoring circuitry, simulations or so forth. Thus, as illustrated, a first configuration set 420A results in obtaining performance data for each workload phase (shown as Perf $A_1$-$A_N$). Similarly, a second configuration set 420B results in obtaining performance data (Perf $B_1$-$B_N$) for the corresponding workload phases. And in turn, a third configuration set 420C results in obtaining performance data (Perf $C_1$-$C_N$) for the corresponding workload phases.

Then analysis of this performance information may occur. Such analysis may include, in an embodiment, determining a highest performance level attained, a lowest power consumption and/or other metrics and cost function that is to be optimized. In the embodiment of FIG. 4A, this analysis indicates that during a first workload phase, first configuration set 420A leads to the best performance, as identified at block $430_1$. In turn, during a second workload phase, third configuration set 420C leads to the best performance, as identified at block $430_2$. And finally during the $N^{th}$ workload phase, second configuration set 420B leads to the best performance, as identified at block $430_N$. Accordingly, dynamic configuration settings may be obtained for different workload phases to improve performance of one or more processor resources as described herein.

While a static training process such as described in FIG. 4A may improve performance, it is possible that a basic assumption of a static training process, namely that each phase has no dependencies on other phases, may lead to some loss of performance improvements. This loss may naturally occur in situations where a subsequent phase has some dependency on one or more earlier phases.

As such, in other implementations, a dynamic training process may be performed. Such dynamic training process may take into account prior workload phases in determining an optimal configuration set for a subsequent workload phase. To this end, a dynamic training process may perform checkpointing such that at the conclusion of a given phase, a checkpoint state resulting from use of a given configuration set may be obtained. This checkpoint state may be used for a next phase of workload execution to increase quality of training data, and further to reduce runtime. Stated another way, saving the image of the running process avoids restarting the entire run from time 0.

Figure 4B:
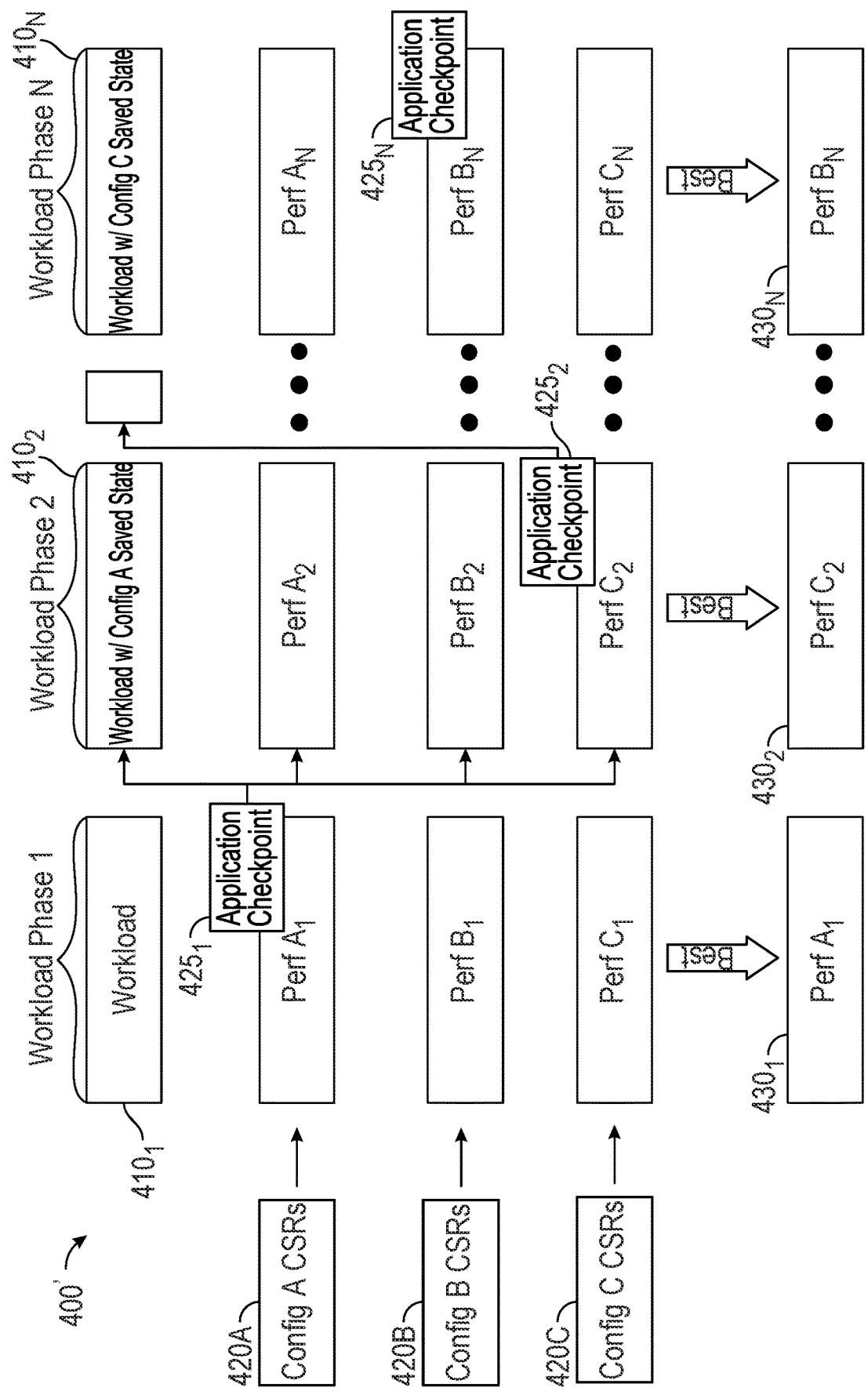
FIG. 4B is a diagram illustrating a dynamic training process in accordance with an embodiment.

Referring now to FIG. 4B, shown is a diagram illustrating a dynamic training process 400' in accordance with an embodiment. Note that such dynamic training process may be performed by way of simulation based on pre-silicon processor design. Of course, in other cases, a dynamic training process may be performed on a processor itself.

In any case, a workload 410 is separated into multiple workload phases $410_1$-$410_N$. Although embodiments are not limited in this regard, each workload phase 410 may be a given number of instructions, e.g., 200K instructions as an example.

To perform dynamic training as shown in FIG. 4B, a first workload phase $410_1$ is executed with each candidate configuration set 420A-C and performance monitoring information is obtained. Subsequent to execution of first workload phase $410_1$ with each of these candidate configurations sets 420, a configuration associated with a best performance is identified. In the example shown in FIG. 4B, this best performing configuration is first configuration set 420A, which leads to a performance result at $430_1$. Accordingly, an application checkpoint $425_1$ is identified, which is a snapshot of workload execution at the end of workload phase $410_1$. More specifically, application checkpoint $425_1$ is a captured state of workload 410 at an end of first workload phase $410_1$ as executed using first configuration set 420A.

As such, continued execution of workload 410 may begin from application checkpoint $425_1$, avoiding the need for re-executing first workload phase $410_1$. In this way, runtime for performing dynamic training may be minimized. Application checkpoint $425_1$ provides a state of workload 410 at a conclusion of first workload phase $410_1$ using the identified best configuration set. Thus, the dynamic training process may continue with second workload phase $410_2$ using application checkpoint $425_1$. As shown, second workload phase $410_2$ is executed with each configuration set 420, and a best configuration is identified, which in this phase corresponds to a third configuration set 420C, which leads to a performance result at $430_2$. Accordingly, another application checkpoint $425_2$ may be obtained, which is the captured state of second workload phase $410_2$ as executed using third configuration set 420C.

Continued execution of additional workload phases, including workload phase $410_N$ may proceed in this way to efficiently identify optimal configuration sets for each workload phase. Understand while shown at this high level in the embodiment of FIG. 4B, many variations and alternatives are possible. Furthermore, to increase the quality of the training data, it is possible to select a random checkpoint/configuration and use that to explore others paths of program execution in terms of possible configurations, but still use the optimal settings for the training data. In other words, always use optimal configurations for training data, but use a random checkpoint to run all configurations for the next phase. This would still be more efficient that running all potential configuration permutations for each phase, which could be done as a brute-force algorithm.

Figure 4C:
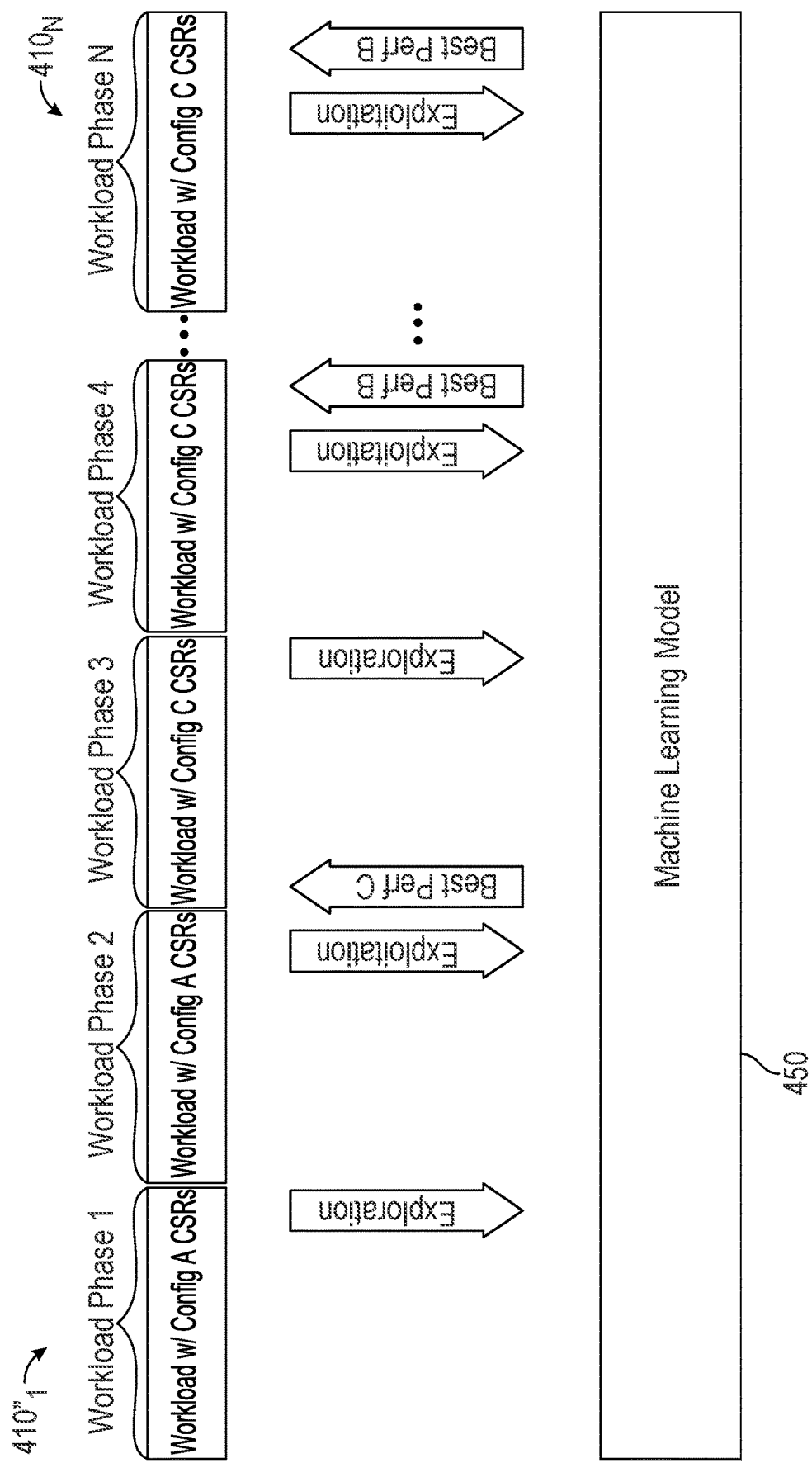
FIG. 4C is a diagram illustrating a reinforcement learning process in accordance with an embodiment.

In still further embodiments, it is possible to perform reinforcement learning to further improve training data in machine learning models. Referring now to FIG. 4C, shown is a diagram of a reinforcement learning process 400" in accordance with an embodiment. As shown in FIG. 4C workload 410 is broken into a plurality of phases $410_1$-$410_N$. Each workload phase 410 may be executed with a given configuration set based on information in a machine learning model 450. In different implementations, machine learning model 450 may be an initial model obtained from static or dynamic training, or in other cases it is an empty/untrained model.

In any event, reinforcement learning may be performed to further improve on the model and explore new configuration paths for each phase. As shown, at a conclusion of certain workload phases of workload 410, an exploration process may be performed in which a different (e.g., randomly selected) configuration set may be used for the next workload phase, to identify whether better performance is realized with this different configuration set than otherwise indicated by the model. As such, for these exploration processes, an exploration candidate configuration set for a next workload phase is selected that is different than an indicated configuration set for the phase according to the model.

As a result of such exploration process, performance data obtained based on execution using the different configuration sets can be evaluated to see if it maximizes the reward function of the reinforcement learning algorithm. If it turns out that the selected exploration candidate configuration setting provides greater performance, it is possible to update machine learning model 450 with this candidate configuration set for the given workload phase.

Instead for other workload phases of workload 410, an exploitation process is performed in which an identified best performant configuration set as obtained from machine learning model 450 is used for a given workload phase, such as shown at workload phase $410_3$.

Figure 5A:
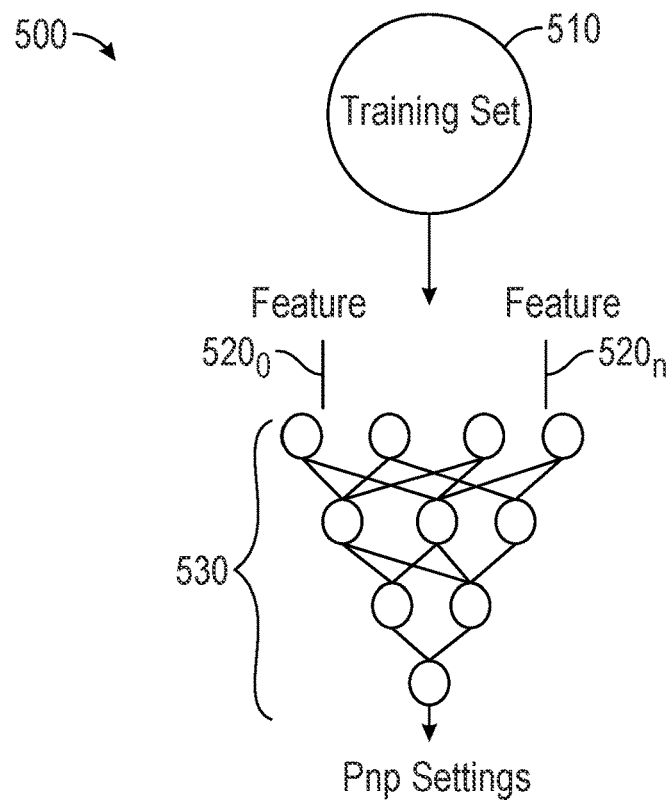
FIG. 5A is a diagram illustrating an offline training process in accordance with an embodiment.

Referring now to FIG. 5A, shown is a diagram illustrating an offline training process in accordance with an embodiment. As shown in FIG. 5A, a process 500 involves obtaining a training set 510. As described herein, training set 510 may be obtained by generating profiling data for each application phase with multiple configuration sets. Understand that in this profiling phase, a number of different performance metrics may be obtained that are representative of the application phase and overall processor state. As such, training set 510 may include a plurality of entries, each for a given phase that includes telemetry information as input/features and an optimal configuration as an output/label.

Next, as shown in FIG. 5A, a plurality of features $520_0$-$520_n$ may be identified through a pruning process performed to reduce the feature list to those features that are most correlating to the optimal configuration set, thus reducing or filtering the number of different inputs. Next, as further show in FIG. 5A, a machine learning model 530 is trained on features $520_0$-$520_n$, to predict an optimal configuration set.

Figure 5B:
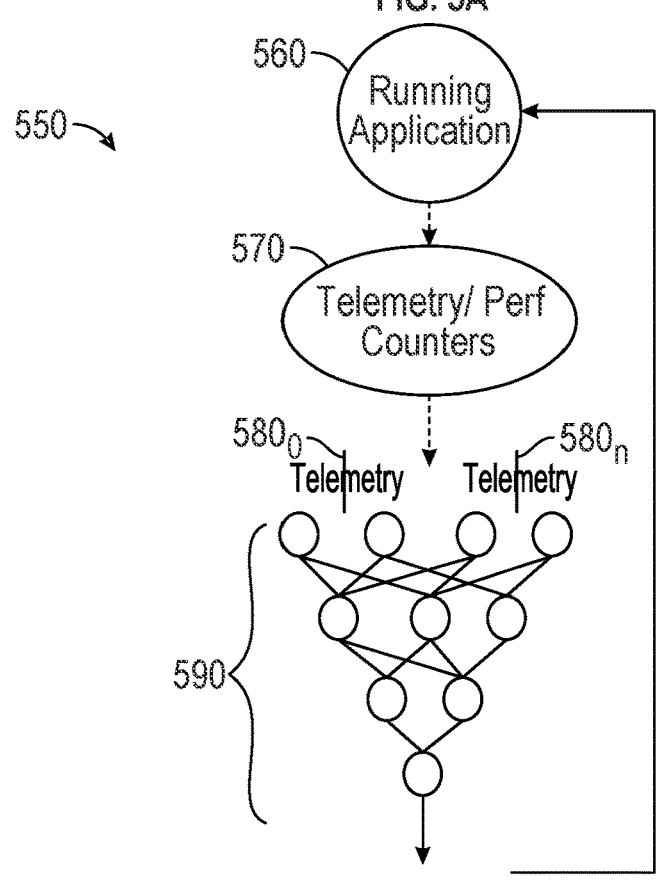
FIG. 5B is a diagram illustrating an online inference process in accordance with an embodiment.

Referring now to FIG. 5B, shown is a diagram illustrating an online inference process in accordance with an embodiment. As shown in FIG. 5B, process 550 may be performed on a given processor, in an embodiment. As illustrated, an application 560 may execute. During such application execution, performance information may be obtained (block 570), which may be maintained in performance monitoring circuitry. From this information, various telemetry information may be extracted or obtained from the performance monitoring information. As shown, in an embodiment telemetry information $580_0$-$580_n$ is provided to a machine learning model 590, e.g., implemented as a Random Forest algorithm. Based on these inputs, machine learning model 590 provides an output corresponding to an optimal configuration set for at least one hardware resource of the processor.

Figure 6:
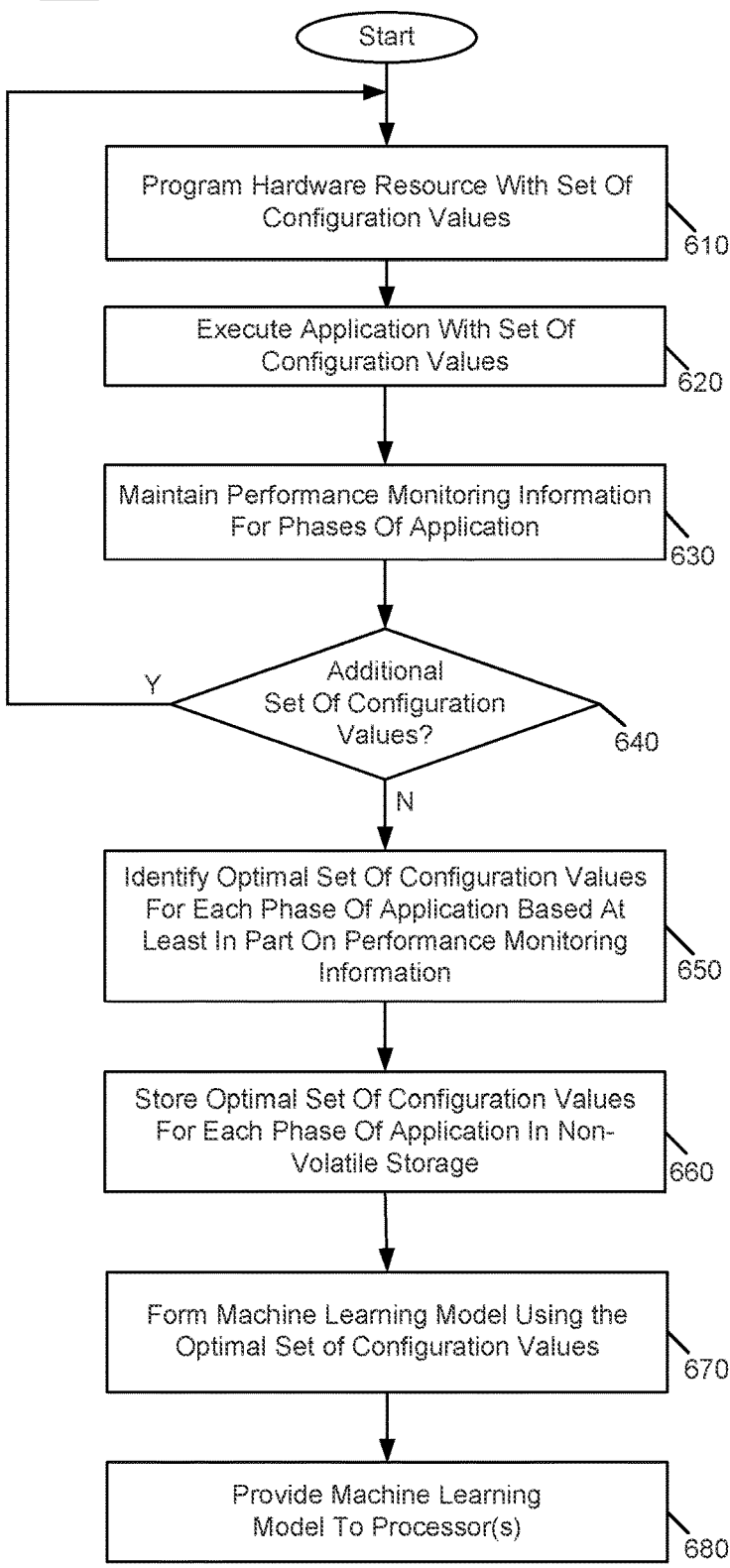
FIG. 6 is a flow diagram of a method in accordance with an embodiment.

Referring now to FIG. 6, shown is a flow diagram of a method in accordance with an embodiment. More specifically, method 600 of FIG. 6 is a method for generating a machine learning model to be used to dynamically tune at least one hardware resource of a processor. In embodiments, method 600 may be performed by one or more computing systems, such as one or more cloud servers that are used in designing processors and other SoC's.

As shown, method 600 begins by programming the hardware resource of the processor with a set of configuration values (block 610). While in some cases, such programming may be performed on a processor in execution on a target system for post-silicon implementation, it is also possible to program a hardware resource in a simulation. In any event, control passes to block 620 where an application may be executed with this set of configuration values. During such execution at block 630 performance monitoring information may be maintained for multiple phases of the application. After such execution it may be determined at diamond 640 whether there are additional sets of configuration values available to be used. If so, control passes back to block 610.

Still with reference to FIG. 6, otherwise when all such sets of configuration values have been used in execution, control passes to block 650 where an optimal set of configuration values may be identified for each phase of the application. More specifically, this identification may be based at least in part on the performance monitoring information. Note that each phase may thus have a different set of configuration values, e.g., obtained during different executions of the application with different configuration sets. Control next passes to block 660 where this optimal set of configuration values for each of phases may be stored in a given non-volatile storage.

With reference still to FIG. 6, next at block 670 a machine learning model may be formed using this optimal set of configuration values. Understand that such machine learning model may be provided to one or more processors (block 680). For example, this machine learning model along with many other such machine learning models for other resource or sets of resources can be provided to the processor(s) by way of inclusion in firmware, via an update mechanism or so forth. Understand while shown at this high level in the embodiment of FIG. 6, many variations and alternatives are possible.

Figure 7A:
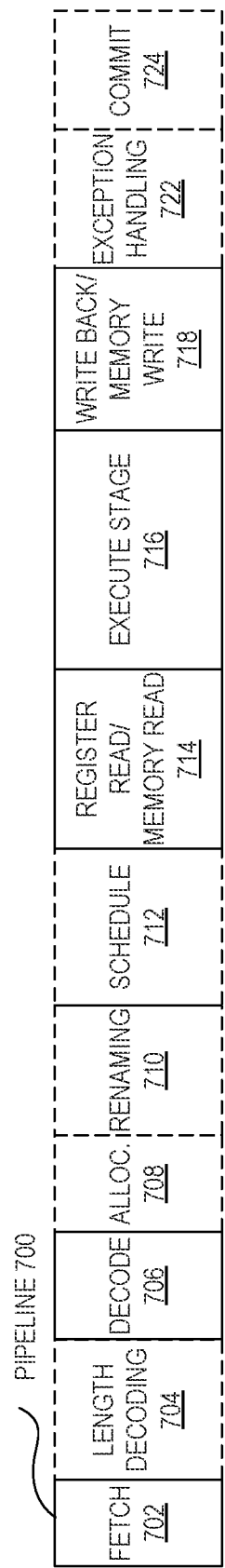
FIGS. 7A and 7B illustrate block diagrams of core architectures.
Figure 7B:
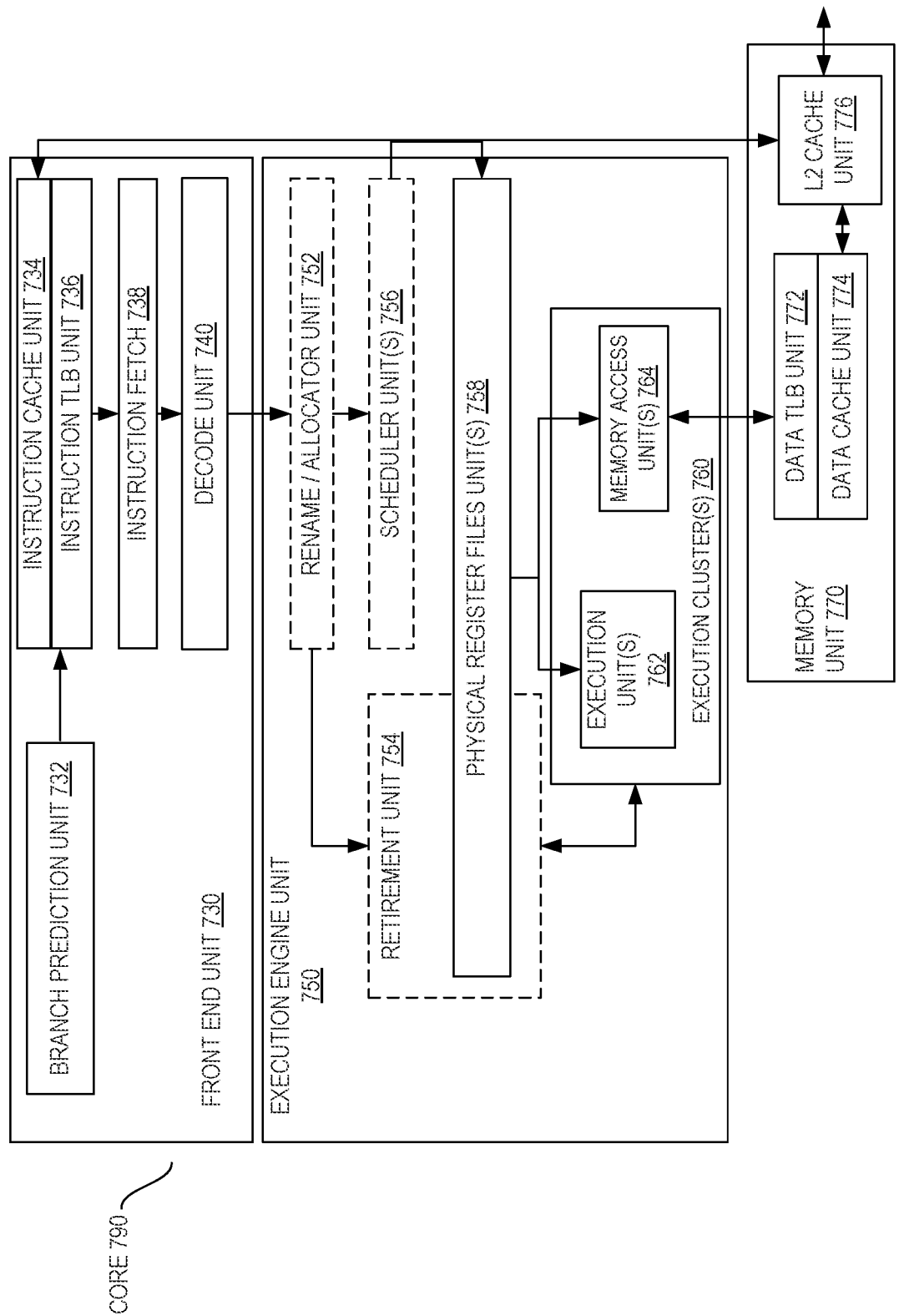

Understand that embodiments may be used in connection with many different processor architectures. FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. Such embodiments may be used to perform dynamic performance tuning of one or more hardware resources using machine learning techniques as described herein. The solid lined boxes in FIGS. 7A and 7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724. Note that as described herein, in a given embodiment a core may include multiple processing pipelines such as pipeline 700.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724. Note that various ones of the units described above can have their performance dynamically tuned using embodiments herein.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Cambridge, United Kingdom), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
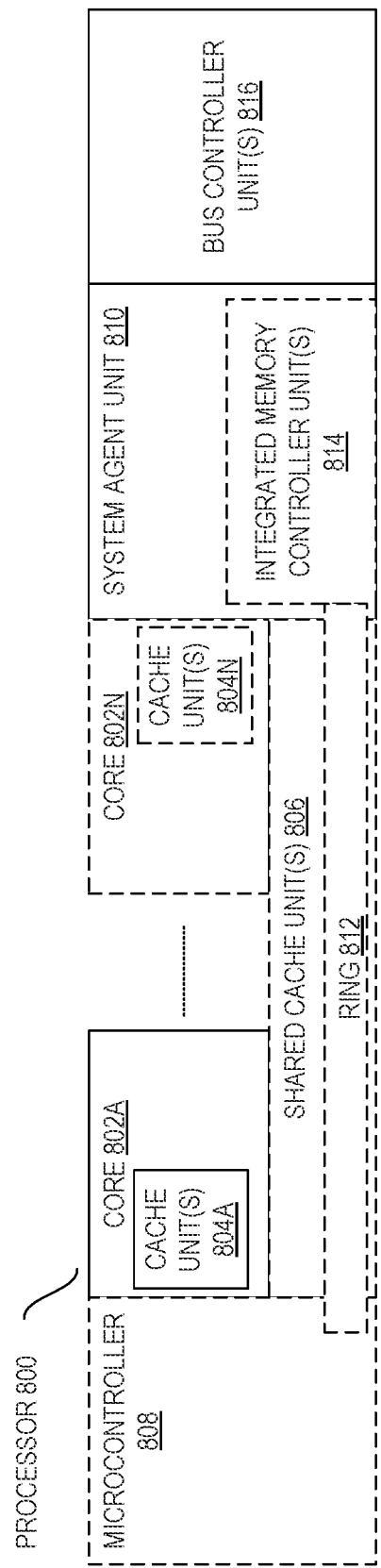
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) in the system agent unit 810, and a microcontroller 808, which may execute ML models (either included in microcontroller 808 or in a non-volatile storage) to dynamically tune various hardware resources within processor 800 in accordance with the embodiments herein.

Thus, different implementations of the processor 800 may include: 1) a CPU with a special purpose logic being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache units 804A-N within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the microcontroller 808, the set of shared cache units 806, and the system agent unit 810/integrated memory controller unit(s) 814, alternative embodiments may use any number of well-known techniques for interconnecting such units.

The system agent unit 810 includes those components coordinating and operating cores 802A-N. The system agent unit 810 may include for example a power control unit (PCU) and a display unit. The PCU may be or include logic and components needed for regulating the power state of the cores 802A-N and the special purpose logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Figure 9:
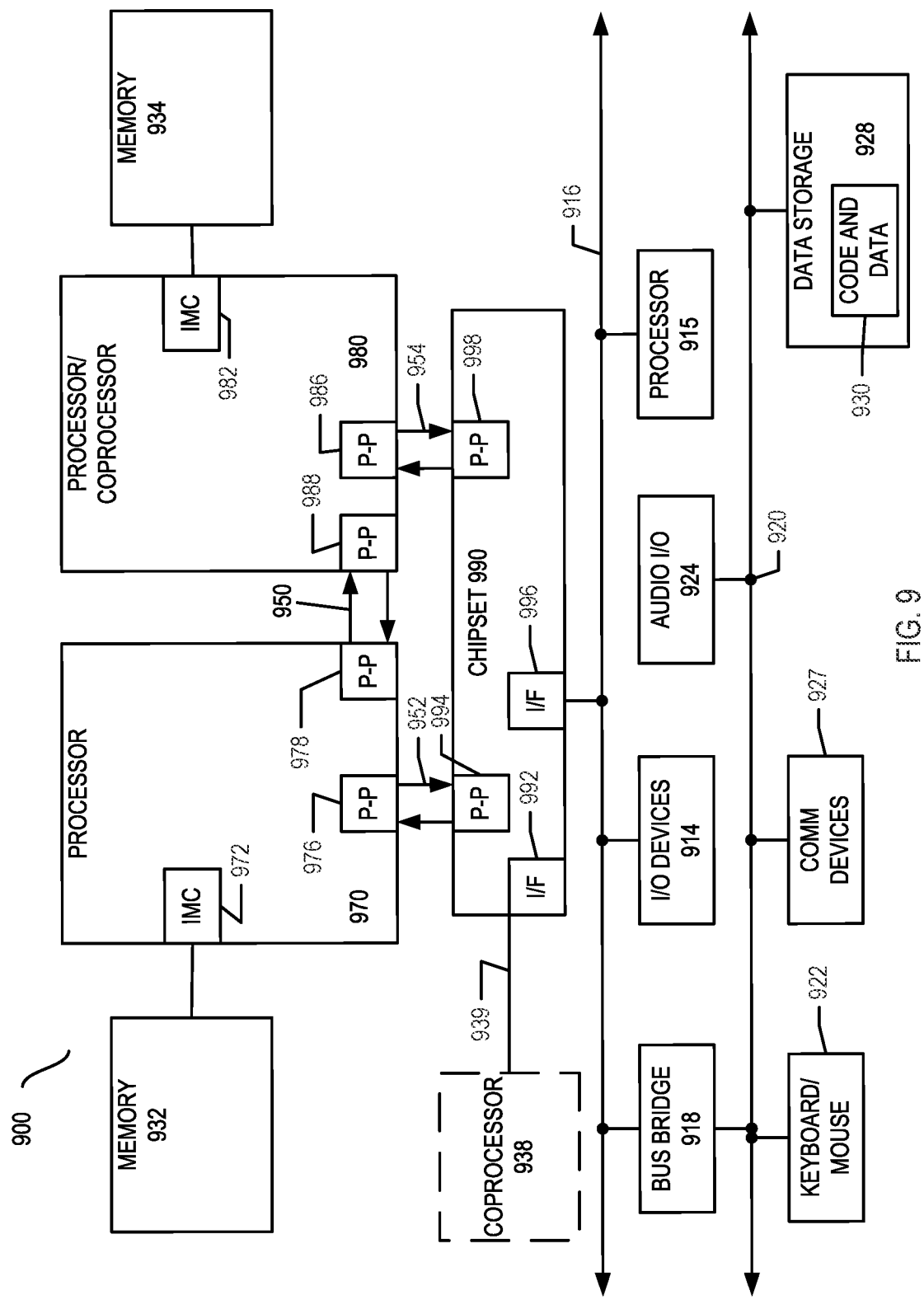
FIG. 9 is a block diagram of a first more specific exemplary system in accordance with an embodiment of the present invention.
Figure 10:
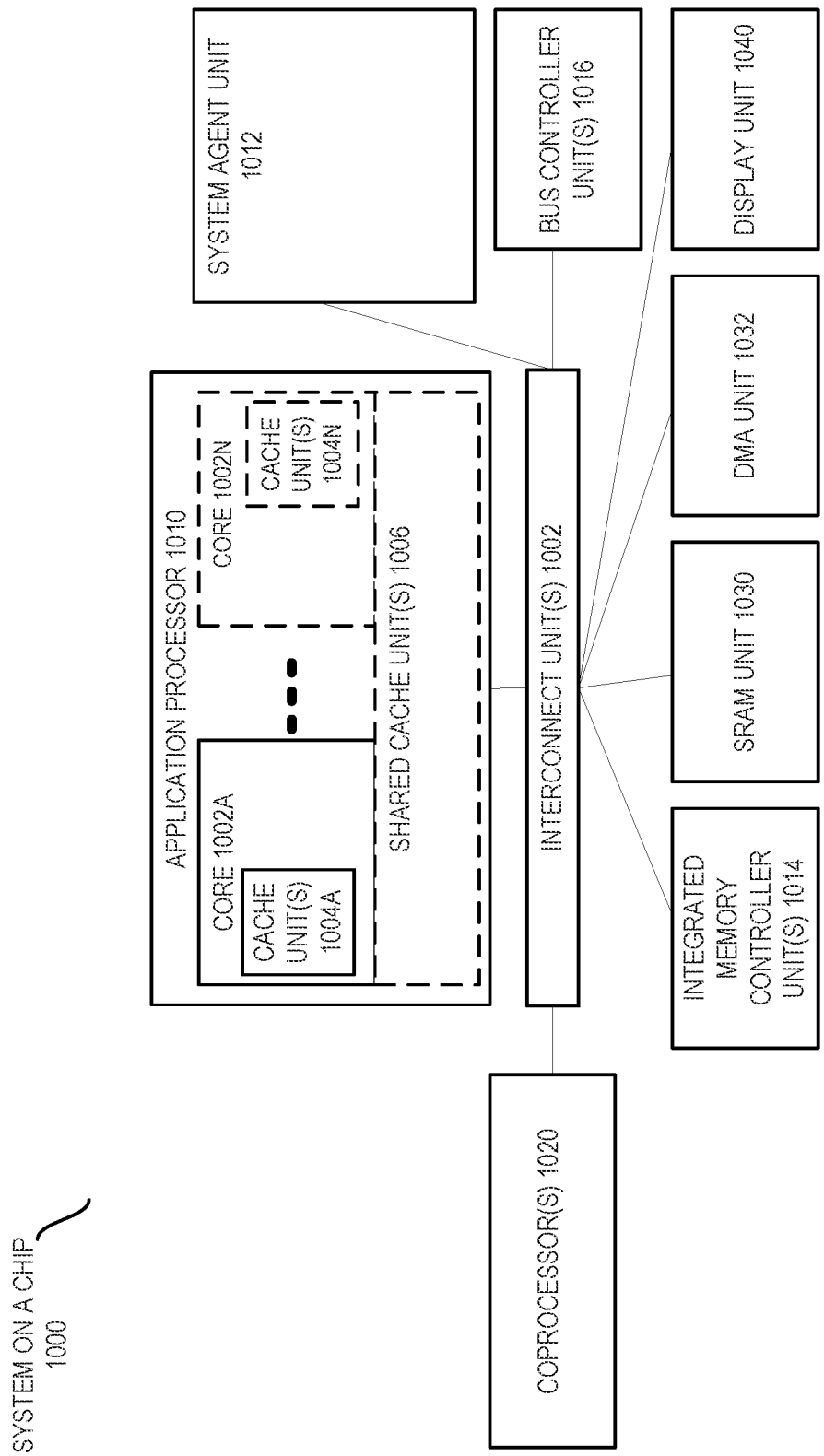
FIG. 10 is a block diagram of a SoC in accordance with an embodiment of the present invention.

FIGS. 9-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 800.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, integrated memory controllers (IMCs) 972 and 982 couple the processors to respective memories, namely a memory 932 and a memory 934, which may be portions of main memory locally attached to the respective processors. In embodiments processors 970, 980 may include microcontrollers or other control logic to execute ML models to dynamically tune various hardware resources within the processors (including IMCs 972, 982).

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Referring now to FIG. 10, shown is a block diagram of a SoC 1000 in accordance with an embodiment of the present invention. Dashed lined boxes are optional features on more advanced SoCs. In FIG. 10, an interconnect unit(s) 1002 is coupled to: an application processor 1010 which includes a set of one or more cores 1002A-N (including constituent cache units 1004A-N) and shared cache unit(s) 1006; a system agent unit 1012; a bus controller unit(s) 1016; an integrated memory controller unit(s) 1014; a set or one or more coprocessors 1020 which may include integrated graphics logic, an image processor, an audio processor, and a video processor; a static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like. In embodiments SOC 1000 may include microcontrollers or other control logic to execute ML models to dynamically tune one or more included hardware resources.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x186 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, CA and/or that execute the ARM instruction set of ARM Holdings of Cambridge, United Kingdom). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

The following examples pertain to further embodiments.

In one example, a processor includes: at least one configuration register to store configuration information for a hardware resource; the hardware resource coupled to the at least one configuration register that includes a control circuit to configure the hardware resource based at least in part on the configuration information; a performance monitor to maintain performance information during execution of an application on the processor; and a controller coupled to the at least one configuration register. The controller may include a machine learning model to dynamically provide the configuration information to the at least one configuration register based at least in part on the performance information and the control circuit is to adjust a performance tuning of the hardware resource according to the configuration information.

In an example, the controller is to dynamically provide first configuration information to the at least one configuration register during a first phase of the application and second configuration information to the at least one configuration register during a second phase of the application.

In an example, the machine learning model is to identify the first phase of the application based on the performance information and provide the first configuration information to the at least one configuration register.

In an example, the machine learning model is built from a training set based on additional performance information regarding the application, the training set comprising a plurality of entries each associating at least some performance information with one or more configuration values for at least one configuration register.

In an example, the processor further comprises a plurality of machine learning models, where each machine learning model of the plurality of machine learning models is associated with at least one hardware resource of the processor.

In an example, the performance monitor comprises at least one counter and a telemetry circuit, and the performance monitor is to provide cache memory metrics to the machine learning model, the cache memory metrics comprising a rate of useless prefetches.

In an example, the hardware resource comprises a prefetcher circuit to speculatively fetch data, where the prefetcher circuit is to be enabled in response to an enable indicator of the configuration information and to operate in a first mode of a plurality of modes based on mode information of the configuration information.

In an example, the controller is to update the configuration information for the prefetcher circuit based at least in part on one or more cache memory metrics.

In an example, the hardware resource comprises a memory controller, where a configuration of the memory controller is to be updated in response to mode information of the configuration information.

In another example, a method comprises: executing, by a processor, an application having a plurality of phases, comprising iteratively executing the application with a different set of configuration values for at least one hardware resource of the processor during each iterative execution of the application; maintaining performance monitoring information obtained for the plurality of phases for each iterative execution of the application; identifying an optimal set of configuration values from the different sets of configuration values for each of the plurality of phases based at least in part on the performance monitoring information; and storing the optimal set of configuration values for each of the plurality of phases in a non-volatile storage.

In an example, the method further comprises forming a machine learning model comprising a plurality of entries, each of the plurality of entries comprising the optimal set of configuration values for one of the plurality of phases and corresponding performance monitoring information associated with the optimal set of configuration values.

In an example, the method further comprises providing the machine learning model to a plurality of processors to enable the plurality of processors to dynamically reconfigure configuration settings for one or more hardware resources of the processor using the machine learning model.

In an example, the method further comprises dynamically updating the machine learning model and providing the updated machine learning model to one or more of the plurality of processors as an in-field patch update.

In an example, the method further comprises identifying the plurality of phases based on a predetermined number of instructions of the application.

In an example, the method further comprises iteratively executing a first phase of the application with each of the different sets of configuration values and identifying the optimal set of configuration values for the first phase based at least in part on the corresponding performance monitoring information associated with the optimal set of configuration values.

In an example, the method further comprises obtaining an application checkpoint at a conclusion of the first phase of the application, the application checkpoint obtained using the optimal set of configuration values for the first phase.

In an example, the method further comprises using the application checkpoint to begin iteratively executing a second phase of the application with the different sets of configuration values for the at least one hardware resource, the second phase of the application following the first phase of the application.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises: at least one processor to execute instructions; and at least one computer readable storage medium coupled to the at least one processor that includes instructions which, when executed by the at least one processor, cause the at least one processor to: iteratively execute an application having a plurality of phases, each iterative execution of the application using a different set of configuration values for at least one hardware resource of an SoC; maintain performance monitoring information for the plurality of phases for each iterative execution of the application; identify an optimal set of configuration values from the different sets of configuration values for each of the plurality of phases based at least in part on the performance monitoring information; and generate a machine learning model comprising the optimal set of configuration values for each of the plurality of phases, each of the optimal set of configuration values associated with one or more performance metric values.

In an example, the at least one computer readable storage medium further comprises instructions which, when executed by the at least one processor, cause the at least one processor to provide the machine learning model for storage in a non-volatile memory of a plurality of SoCs to cause the plurality of SoCs to dynamically configure the at least one hardware resource during execution of the application.

In an example, the at least one computer readable storage medium further comprises instructions which, when executed by the at least one processor, cause the at least one processor to dynamically update the machine learning model and provide the updated machine learning model to one or more of the plurality of SoCs as an in-field patch update.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one computer readable storage medium having stored thereon instructions, which if performed by a machine cause the machine to perform a method comprising:
executing, by a processor, an application having a plurality of phases, the executing comprising iteratively executing the application with a different set of configuration values for at least one hardware resource of the processor during each iterative execution of the application, the executing further comprising iteratively executing a first phase of the application with each of the different sets of configuration values;
maintaining performance monitoring information obtained for the plurality of phases for each iterative execution of the application;
identifying an optimal set of configuration values, the optimal set of configuration values with respect to an optimization cost function, from the different sets of configuration values for each of the plurality of phases based at least in part on the performance monitoring information, the identifying comprising identifying an optimal set of configuration values for the first phase based at least in part on corresponding performance monitoring information indicating at least one of a highest performance level and a lowest power consumption level associated with the optimal set of configuration values for the first phase; and
storing the optimal set of configuration values for each of the plurality of phases in a non-volatile storage.

2. The at least one computer readable storage medium of claim 1, wherein the method further comprises forming a machine learning model comprising a plurality of entries, each of the plurality of entries comprising an optimal set of configuration values for one of the plurality of phases and corresponding performance monitoring information associated with the optimal set of configuration values for the one of the plurality of phases.

3. The at least one computer readable storage medium of claim 2, wherein the method further comprises providing the machine learning model to a plurality of processors to enable the plurality of processors to dynamically reconfigure configuration settings for one or more hardware resources of the plurality of processors using the machine learning model.

4. The at least one computer readable storage medium of claim 3, wherein the method further comprises dynamically updating the machine learning model and providing the updated machine learning model to one or more of the plurality of processors as an in-field patch update.

5. The at least one computer readable storage medium of claim 1, wherein the method further comprises identifying the plurality of phases based on a predetermined number of instructions of the application.

6. The at least one computer readable storage medium of claim 1, wherein the method further comprises obtaining an application checkpoint at a conclusion of the first phase of the application, the application checkpoint obtained using the optimal set of configuration values for the first phase.

7. The at least one computer readable storage medium of claim 6, wherein the method further comprises using the application checkpoint to begin iteratively executing a second phase of the application with the different sets of configuration values for the at least one hardware resource, the second phase of the application following the first phase of the application.

8. A system comprising:
at least one processor to execute instructions; and
at least one computer readable storage medium coupled to the at least one processor, the at least one computer readable storage medium comprising instructions which, when executed by the at least one processor, cause the at least one processor to:
iteratively execute an application having a plurality of phases, each iterative execution of the application using a different set of configuration values for at least one hardware resource of a system on chip (SoC);
maintain performance monitoring information for the plurality of phases for each iterative execution of the application;
identify, based on an optimization cost function, an optimal set of configuration values from the different sets of configuration values for a respective phase of the plurality of phases based at least in part on the performance monitoring information, the optimal set of configuration values associated with at least one of a highest performance and a lowest power consumption for the respective phase indicated by the performance monitoring information;
generate a machine learning model comprising the optimal set of configuration values for each of the plurality of phases, each of the optimal set of configuration values associated with one or more performance metric values; and
provide the machine learning model for storage in a non-volatile memory of a plurality of SoCs to cause the plurality of SoCs to dynamically configure the one or more hardware resources of the plurality of SoCs during execution of the application.

9. The system of claim 8, wherein the at least one computer readable storage medium further comprises instructions which, when executed by the at least one processor, cause the at least one processor to dynamically update the machine learning model and provide the updated machine learning model to one or more of the plurality of SoCs as an in-field patch update.

10. A method comprising:
executing, by a processor, an application having a plurality of phases identified based on a predetermined number of instructions of the application, the executing comprising iteratively executing the application with a different set of configuration values for at least one hardware resource of the processor during each iterative execution of the application;
maintaining performance monitoring information obtained for the plurality of phases for each iterative execution of the application;
identifying, based at least in part on instructions per cycle, an optimal set of configuration values from the different sets of configuration values for a respective phase of the plurality of phases based at least in part on the performance monitoring information, the optimal set of configuration values associated with at least one of a highest performance and a lowest power consumption for the respective phase indicated by the associated performance monitoring information; and
storing the optimal set of configuration values for each of the plurality of phases in a non-volatile storage.

11. The method of claim 10, further comprising forming a machine learning model comprising a plurality of entries, each of the plurality of entries comprising an optimal set of configuration values for one of the plurality of phases and corresponding performance monitoring information associated with the optimal set of configuration values for the one of the plurality of phases.

12. The method of claim 11, further comprising providing the machine learning model to a plurality of processors to enable the plurality of processors to dynamically reconfigure configuration settings for one or more hardware resources of the plurality of processors using the machine learning model.

13. The method of claim 12, further comprising dynamically updating the machine learning model and providing the updated machine learning model to one or more of the plurality of processors as an in-field patch update.

* * * * *